(12) United States Patent
Lukin (10) Patent No.: US 6,973,169 B1
(45) Date of Patent: Dec. 6, 2005

(54) TELEPHONE NETWORK FOR A STRUCTURED ITEM AND TELEPHONE COMMUNICATION SYSTEM BETWEEN REMOTE STRUCTURED ITEMS USING THIS NETWORK

(76) Inventor: Aleksandr Fyedorovich Lukin, Ulitsa Denisa Davydova, dom 28b, kv.3, 690105 Vladivostok (RU)

( * ) Notice: Subject to any disclaimer, the term of this patent is extended or adjusted under 35 U.S.C. 154(b) by 0 days.

(21) Appl. No.: 09/530,937

(22) PCT Filed: Sep. 7, 1999

(86) PCT No.: PCT/RU99/00329

§ 371 (c)(1),
(2), (4) Date: May 5, 2000

(87) PCT Pub. No.: WO00/14943

PCT Pub. Date: Mar. 16, 2000

(30) Foreign Application Priority Data

Sep. 9, 1998 (RU) .............................. 98116701/09

(51) Int. Cl.[7] ............................................ H04M 11/00
(52) U.S. Cl. ................................ 379/93.07; 379/93.05; 370/352
(58) Field of Search .......................... 379/90.01, 93.01, 379/93.05, 93.08, 219, 220.01, 93.06, 93.07; 370/351–356, 370/392–393, 404, 461–463, 465; 455/408–409

(56) References Cited

U.S. PATENT DOCUMENTS

| | | | |
|---|---|---|---|
| 5,325,418 A | 6/1994 | McGregor et al. | .......... 455/408 |
| 5,325,423 A | 6/1994 | Lewis | ...................... 379/93.08 |
| 5,394,461 A | 2/1995 | Garland | ................. 379/106.03 |
| 5,526,353 A * | 6/1996 | Henley et al. | ............... 370/392 |
| 5,742,596 A * | 4/1998 | Baratz et al. | ................ 370/356 |
| 5,892,764 A * | 4/1999 | Riemann et al. | ............ 370/401 |

(Continued)

FOREIGN PATENT DOCUMENTS

DE      42 30 561      5/1993

(Continued)

OTHER PUBLICATIONS

G. Bolshova; "CTI Offers a Comprehensive Solution for Computer Telephony" (*Seti*, No. 2, 1998, pp 40-46).

(Continued)

*Primary Examiner*—George Eng
(74) *Attorney, Agent, or Firm*—J. Harold Nissen; Lackenbach Siegel, LLP (57) ABSTRACT

This invention relates to electronic communications technology. A telephone network of a structured site of the business office type comprises a local computer network linking computers at the transmitting and receiving ends of the system through network adapters, and also telephone sets. The telephone network is provided with a computer telephony server connected to the local computer network and to the general local telephone network. Each telephone set is connected directly to the local computer network. Connection is made through a telephone adapter and a network adapter connected in series with it. The telephone adapter is capable of converting analog/digital signals adapted to the clock frequency of the local network, user call signals into the addresses of other telephone adapters connected to the local computer networks, and hang-up signals.

To establish communication between remote sites having identical telephone networks, the local computer network of each site is provided, in the channel of the external computer network, with a router connected through said channel to routers in other local networks.

9 Claims, 3 Drawing Sheets

U.S. PATENT DOCUMENTS

| | | | |
|---|---|---|---|
| 6,011,794 A * | 1/2000 | Mordowitz et al. | 379/90.01 |
| 6,069,899 A * | 5/2000 | Foley | 370/494 |
| 6,122,287 A * | 9/2000 | Ohanian et al. | 370/465 |
| 6,144,724 A * | 11/2000 | Stovall | 379/93.05 |
| 6,167,043 A * | 12/2000 | Frantz | 370/356 |
| 6,339,593 B1 * | 1/2002 | Kikinis | 370/352 |
| 6,456,625 B1 * | 9/2002 | Itoi | 370/401 |

FOREIGN PATENT DOCUMENTS

| | | | | |
|---|---|---|---|---|
| DE | 43 30 757 | | 3/1995 | |
| EP | 0 474 407 | | 8/1991 | |
| EP | 0 664 637 | | 7/1995 | |
| EP | 829995 A2 * | | 3/1998 | H04M 3/00 |
| GB | 2343584 A * | | 5/2000 | H04M 7/00 |
| JP | 09098227 A * | | 4/1997 | H04M 11/06 |
| RU | 2 105 425 | | 2/1998 | |
| RU | 2105425 C1 * | | 2/1998 | H04M 11/00 |
| WO | WO 94/24803 | | 10/1994 | |
| WO | WO 94/27396 | | 11/1994 | |
| WO | WO 98/13996 | | 4/1998 | |

OTHER PUBLICATIONS

D. Broderick and B. Tall; "High-Speed Data Transfer Routes" (*Seti, No. 7*, 1996, pp 87-92).

E. Clark; "Gigabit Ethernet Gathers Speed" LAN Magazine (Network Solutions Magazine) vol. 4, No. 3, 1998.

I. Sungelei; "FDDI Networks: Operating Principle, Equipment Used, and Application Options" Open Systems No. 3, 1994.

A Carve; "Ring Ruler" LAN Magazine (Russian language edition), vol. 1, No. 4, 1995.

M Kulgin; "Switching as Routing" LAN Magazine (Network Solutions Magazine) vol. 3, No. 8, 1997.

O. Varlamova; Noise-Resistant Codecs, the Future of Digital Telephony (*Seti, No. 10*, 1997, pp 26-32).

A. Altergot and I. Panfilov; "Computer and Telephone Meeting Halfway" LAN Magazine (Network Solutions Magazine) vol. 3, No. 8, 1997.

N. Lippis; "IP as an International Voice Communications Infrastructure?" LAN Magazine (Network Solutions Magazine) vol. 3, No. 7, 1997.

A. Curva "IP Telephony Now Has A Voice" LAN Magazine (Network Solutions Magazine) vol. 4, No. 2, 1998.

A. Kreines; *"Our Neighbors' IP Telephony"* (*Seti, No. 5*, 1998, pp 58-59).

E. Zieger; *IP Telephony Becomes a Reality* (*Seti, No. 3*, 1998 pp 112-117).

E. Margulis; "Ready Pseudo-Office Telephone Switches" LAN Magazine (Network Solutions Magazine) vol. 4, No. 4, 1998.

E. Margulis; "Economical Pseudo-Office Telephone Switches" LAN Magazine (Network Solutions Magazine) vol. 4, No. 3, 1998.

* cited by examiner

TELEPHONE NETWORK FOR A STRUCTURED ITEM AND TELEPHONE COMMUNICATION SYSTEM BETWEEN REMOTE STRUCTURED ITEMS USING THIS NETWORK

FIELD OF APPLICATION

This invention relates to electrical communication technology, and more particularly to a telephone network combined with other electrical systems, and may be used for voice communication between local telephone line users through general computer networks.

PRIOR STATE OF THE ART

At present, telephone service users can be divided into two categories—private and corporate. The differences between them are not only that private customers use the telephone at home and corporate ones do this in office, but also that corporate customers, on average, rely on the telephone from two to two and half times as frequently as private subscribers.

It is a general rule that while a business office uses two or three local telephone lines (numbers of a local automatic central telephone switching office, or CTO), their connection does not differ from that of private users, namely, a wire line (telephone wire pair) is laid from a local CTO to the business office, with telephone sets connected at the end of it.

If a business office has 10 to 15 staff employees, a telephone network of this kind is ineffective for a number of reasons: a significant volume of traffic ends within the office, the employees phoning one another through the central switching office (CTO), unjustifiably keeping the connecting lines busy, reducing chances of incoming calls from the local network getting through, and paying the bill for a larger number of local lines (numbers) than what is actually needed.

For these reasons, with an office staff in excess of 15, it is justified to use office traffic concentrators or office switching systems. Whatever the case, the office telephone network is built on the following principle: each employee has an individual telephone set connected by lines or wire pairs running inside the office to the office switch. In turn, the office switch is linked by channels or connecting lines to a general local telephone network (GTN).

In this option, the office telephone network is built according to an internal network numbering plan, under which each telephone set is assigned an individual user number in the office switching system. As a rule, it is shorter than a local telephone network number, that is, it has a smaller number of digits. For example, two digits are enough to provide telephone service to a network of less than 80 users, three digits for less than 800 users, and so on. When a user dials an internal network number a direct call is placed to another user of the same office network. Commonly, digits 9 or 0 are used for connection to a local network, digit 8 for calling a long-distance system number, and so on.

A business office telephone network, therefore, achieves several objectives. First, all calls within the office are made between employees without reaching out to the local network. Traffic from the office network to the GTN becomes lighter and the network is more accessible for incoming calls from the GTN to the office network. Second, a network organized on this pattern may reduce significantly the number of connecting lines to the local network and, therefore, yield significant economies, because of a smaller number of user or connecting lines will be billed. Practical experience shows that an average load on an internal user's line of an office network, when it is connected to the local network, is rarely more than 25% or 30% of the traffic time. This means that for a business office with 100 network users it is normal to have 25 to 30 connecting lines to the GTN, instead of 100 direct circuit lines. Accordingly, the total fee charged by the general local network operator is reduced to a third or a quarter of the telephone bill.

Besides, modern office telephone switches manufactured by leading firms such as Lucent Technologies, Siemens, Alcatel, Ericsson and NEC, among others, are digital systems offering numerous advantages. Their digital channels are connected to local telephone networks. These switching systems are capable of being combined into corporate telephone networks (Virtual Private Networks, or VPNs) integrating the telephone networks of several remote offices or branches with the head office, even if the remote offices are located in the same city, or in different cities, or even in different countries.

For the telephone networks of the head office to be linked to the branches, its switch has to be provided with trunk cards for connecting the digital channels of one switching network to the communication operator transmission systems, while at the branch end these transmission systems are to be linked to the respective trunk cards of the branch switch. A common numbering plan is then programmed to allow users to call, by direct speed dialing, one another regardless of whether the head office and its branch are situated in the same city or in different cities.

In practice, however, since the channel capacity is a costly service and insofar as both the telephone and computer networks of the remote offices are to be connected, options that are typically offered provide for a possibility of computer and telephone networks being combined to transmit different data types (protocols) through the same channel.

Broad functional opportunities are offered by a communication system described in WO No. 94/24803, H04M 11/00, 1994, which can transmit audio and video data and messages. It comprises multiple services to enable virtual functions that can be used to connect users having different hardware and to provide access to both integrated and non-integrated networks. This system is, however, relatively complicated.

Another structured site telephone network, described in U.S. Pat. No. 5,325,423, H04M 11/00, 1995, comprises computers at the transmitting and receiving ends connected by a communication line, an analog-to-digital converter and digital-to-analog converters at the transmitting and receiving ends of the system, respectively. A multimedia modem receives complex dialog information from the communication network, and the memory receives complex dialog information from the modem. A compressor is provided to compress at least part of the complex dialog information received from the modem and the memory. A decompressor expands this part of the information. The system contains a transmitter for the uncompressed part of the dialog information received from the communication network and a mixer to mix the expanded part with the uncompressed part to produce an output signal.

This prior art system is disadvantageous in that it uses sophisticated firmware to organize voice communication between users through a general computer network, since the analog signal generated in the system is unsuited for direct transmission of voice information to local telephone lines.

Yet another prior art structured site telephone network, described in RU Patent No. 2,105,425, H04M 11/00, 1998, comprises a computer network connecting computers at the transmitting and receiving ends of the system, a compressor and an analog-to-digital converter at the transmitting end of the system, a decompressor and a digital-to-analog converter at the receiving end of the system, wherein the transmitting end of the system has a telephone set connected, through the local telephone line, to the input of a signal detector-distributor, a first output of which is connected to the input of a tone dialing recognition device that has its output connected to the input of a recognized number transmission device, whose output is connected to a computer network; a second output of the signal detector-distributor is linked to the input of an analog-to-digital converter, whose output is connected to the input of a compressor having its output connected to the transmitting end computer, and the receiving end of the system has a telephone set connected through the local telephone line to the output of a voice and tone signal transmission priority device, a first input of which is connected to the output of a call signal dialer, which has its input linked to a call number information converter having its input connected to the computer network, a second input of the voice and tone signal transmission priority device being linked to the output of a voice signal transmitter, which has its input connected to the output of a digital-to-analog converter, whose input is connected to the output of a decompressor having its input connected to the receiving end computer.

This prior art telephone network system provides new opportunities for signal transmission and reception using general-purpose equipment, making the communication process simpler and cutting its costs, and can be regarded as a basic design for building corporate long-distance and international communication nodes, allowing the same channels to be used to transmit computer data and to maintain voice communication.

The prior art communication system, however, has drawbacks because computer stations are to be provided in the circuit between the telephone set and the network to effect programmable control of the data transmission and reception process to maintain communication between users. This system is suitable for several users, and becomes complicated and expensive because of more additional firmware needed as the number of users increases.

DISCLOSURE OF THE INVENTION

It is an object of this invention to develop a telephone communication system allowing voice messages to be transmitted directly within the framework of a structured local site such as a business office and between remote users of local telephone networks interconnected through a general computer network.

The technical effect achieved by using this invention consists in providing a simpler and less expensive telephone network of an individual local site by integrating it in the site computer network and simplifying its communication with remote sites.

This technical effect is achieved, for the first site, in the telephone network of a structured site, preferably of a business office type, comprising a local computer network linking the computers at the transmitting and receiving ends of the system by means of network adapters and also telephone sets, which network is provided with a computer telephony server connected to the local computer network and to a general telephone network, each telephone set being connected directly, through a telephone adapter and a network adapter connected in series therewith, to the local computer network, the telephone adapter being capable of converting analog/digital signals adapted to the clock frequency of the local network, user call signals into the addresses of other telephone sets connected to that local computer network, and hang-up signals.

Also, at least some of the computers connected to said computer network may be provided with multimedia software to establish direct voice telephone communication.

In one embodiment, the telephone adapter may be provided with a transmission channel and reception channels, the transmission channel has a signal detector-distributor having its input connected to a telephone set and a first output linked to the input of a tone dial recognition device, which has an output connected to the input of a recognized number transmission device, whose output is connected to the local computer network, a second output of the signal detector-distributor being linked to the input of an analog-to-digital converter having its output connected to the input of a compressor, whose output is connected to a processor unit provided with software to effect digital information exchange within the framework of common network protocols, the reception channel having a voice and tone signal transmission priority device, whose output is connected to the telephone set and a first input of which is linked to the output of a call signal dialer having its input connected to a call number information converter, whose input is connected to the local computer network, a second input of the voice and tone signal transmission priority device being connected to the output of a voice signal transmitter having its input connected to the output of a digital-to-analog converter, whose input is connected to the output of a decompressor having its input connected to said processor unit.

The aforesaid processor unit is a central processing unit connected to digital information input-output units and also to a stored-program memory and a random-access memory to have digital information exchanged within the framework of common network protocols.

The above technical result is achieved, for a second site, in a telephone communication system using an external computer network channel between the remote structured sites, having, at the first site, an internal telephone network comprising a local computer network provided with network adapters to interconnect the computers at the transmitting and receiving ends of the system, and telephone sets, which system has, at the first site, a computer telephony server connected to the local computer network of this site and to the general telephone network in the area of this site, each telephone set being connected directly, through the telephone adapter and the network adapter connected in series therewith, to the local computer network, the telephone adapter being capable of converting analog/digital signals adapted to the clock frequency of the local network, user call signals to the addresses of other telephone adapters connected to said local computer network, and hang-up signals, each successive site being provided with an internal telephone network duplicating the telephone network of the first site, the local computer network of each site being provided with a router that is connected thereto and to the router of the local computer network of at least one other site through the communication channel of the computer networks of the remote structured sites.

The above features are essential and interrelated to produce a combination of distinguishing features that are important in achieving the desired technical effect.

In particular, the interface design to connect a user's telephone set to a local computer network bus in establishing connection between the telephone set and the network allows user calls to be switched within a business office without requiring a specialized switching device at the central telephone office (CTO) to be used, a numbering plan corresponding to the addresses of the telephone adapters in the local network of the business office to be used for the telephone network of the business office; a single telephone user numbering plan to be used in the head office and its remote branches; a single technique to be used in connecting the local networks and the telephone networks of the head office and its branches without requiring such technologically complex devices as a multiplexer; a user number in the telephone network to be automatically tied to the interface address of the user's telephone set in the local network, allowing the user to move freely around the business office or its remote branches; calls of the telephone-computer or computer-telephone to be made; and the telephone network of the business office to be connected flexibly to both general telephone networks and Internet telephony or IP telephony networks.

A BRIEF DESCRIPTION OF THE DRAWINGS

The idea of the invention is illustrated in the following drawings, in which.

PREFERRED EMBODIMENTS OF THE INVENTION

This invention is described with reference to the following concrete embodiments, which are not, however, exclusive and only helpfully illustrate the possibility of the desired technical result being achieved through the use of the combination of features described herein.

Modern-day local networks used in business offices are not particularly varied. These are, above all, networks using the Ethernet protocol. Whereas previously such networks had a clock frequency of 10 MHz and a limited number of devices linked to a common bus, recent years have seen a growing use of Ethernet networks with a throughput capacity of 100 Mbit and even gigabit-range networks [2], [3], [5]. All other networks using Token Ring [2] or FDDI [4] protocols, for all the differences in their protocols, do not essentially change anything in the approaches to the problem of integrating the telephony and data of local networks. These facts are sufficient evidence that the bit-transfer rates in existing local networks are fully adequate to the task of handling telephone communications of a business office [6].

Since the throughput capacity of local networks interconnecting computers is today fully capable of meeting the requirements of office telephone communication as well, it is reasonable for an idea to emerge to develop a suitable interface for a conventional telephone set so it could be used as a local network device of a business office. An interface of this kind, used at the local network side is common enough, comprising an ordinary network card (network adapter), linking the local network and personal computers connected to the network, or workstations. The functions of an interface (telephone adapter) at the telephone set side could be performed by the device described in RU Patent No. 2,105,425. At the telephone set side, this interface (telephone adapter) is designed as an analog/digital signal converter adapted to the clock frequency of the local network and functioning as a converter of user call (pulse or tone dialing) signals into the addresses of other telephone interfaces connected to the local network, and also as a telephone line hang-up signal converter.

Figure 1:
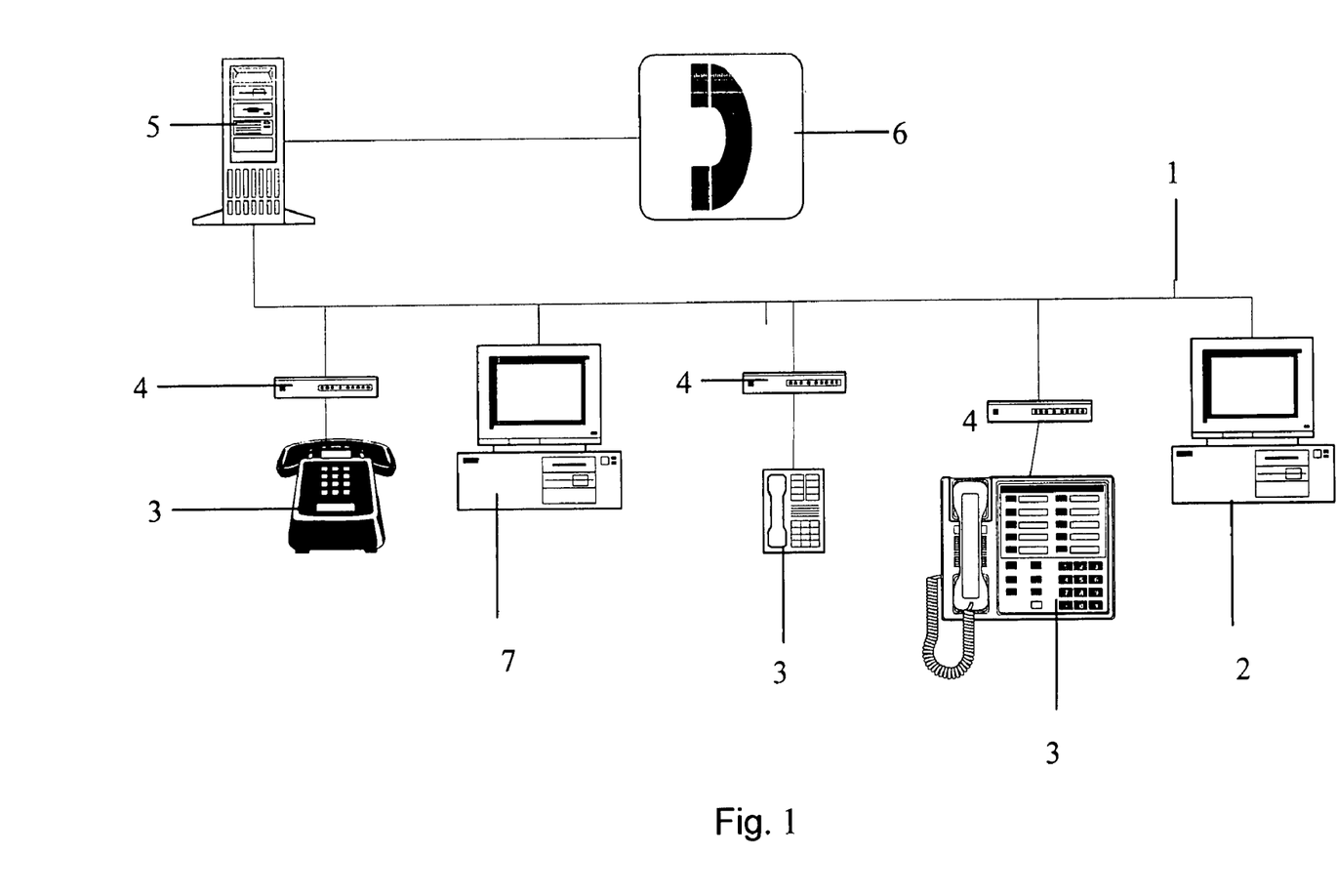
FIG. 1 is a block diagram of a business office telephone network.

A general layout diagram of the telephone network of a structured site, for example, a business office, in accordance with this invention is shown in FIG. 1.

As in a conventional local computer network of a business office, a common bus of a local computer network 1 is linked to computer workstations 2 or other devices (printers, servers, and so on). Also, at least some of the computers are provided with a multimedia program to maintain direct voice communication. This design of computer stations is described, for example, in U.S. Pat. No. 5,325,418, H04M 11/00, published in 1994, or in U.S. Pat. No. 5,325,423, H04M 11/00, published in 1994.

User telephone sets 3 are connected to the inputs of telephone adapters (interfaces) 4 having their outputs connected to a bus of the computer network 1. The bus of the computer network 1 is connected to a computer telephony server 5 that has its digital channel or connecting lines linked to a general telephone network (GTN) 6. The telephone adapters may also be connected to facsimile machines, for graphic images to be sent from computer network workstations, with appropriate software available, to workstations equipped with facsimile machines.

A telephone communication system using an external computer network channel between remote structured sites, for example, of business office type and remote branches, comprises, at the first site, for example, the business office, an internal telephone network similar to the one shown in FIG. 1. Each successive site has an internal telephone network duplicating the telephone network of the first site, the local computer network of each site being provided with a router connected to the local computer network and linked to the router of the local computer network of at least one other site through the external computer network channel.

Figure 2:
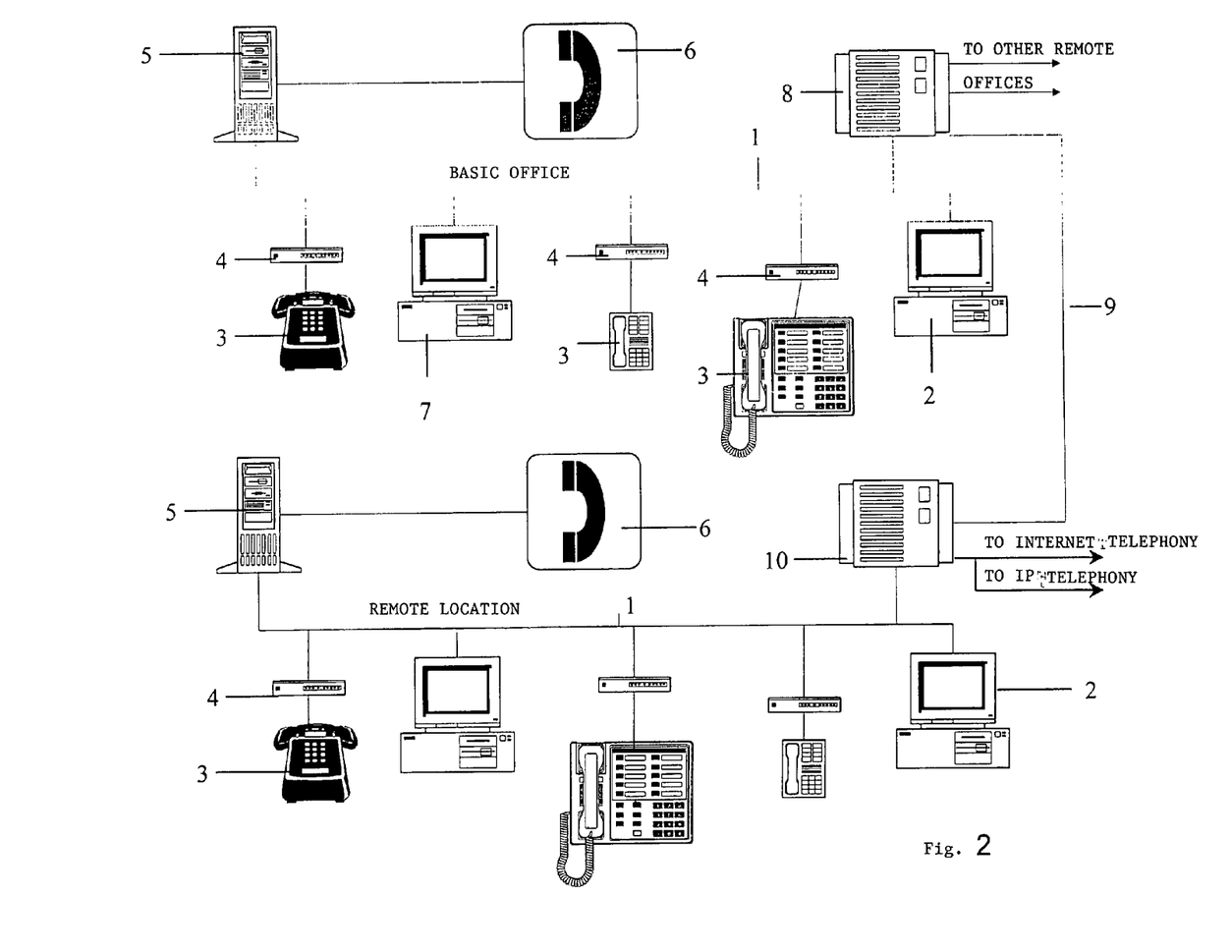
FIG. 2 is a diagrammatic view of a telephone link between a business office and its remote branch.

The communication system connecting the head office with a remote branch is shown diagrammatically in FIG. 2, in which two local communication systems identical or closely resembling each other in circuitry (of the type shown in FIG. 1), one being the head office and the other its remote branch, are interconnected by a router 8 connected at one side to the network 1 of the head office and at the other side, through a communication channel 9, to a router 10 connected to the local network 1 of the remote branch. The channel 9 is an external computer network, that is, a communication channel for the computer networks of the remote structured sites. This may be a selected digital communication channel for integrated connection of the branch to the head office, or a part of the general computer network, or a part of the computer network of a business.

The telephone adapter 4 converts analog/digital signals and is adapted to the clock frequency of the local network and converts user call signals (pulse or tone dialing) to the addresses of other telephone interfaces connected to the local network, and also functions as a telephone line hang-up signal converter.

Figure 3:
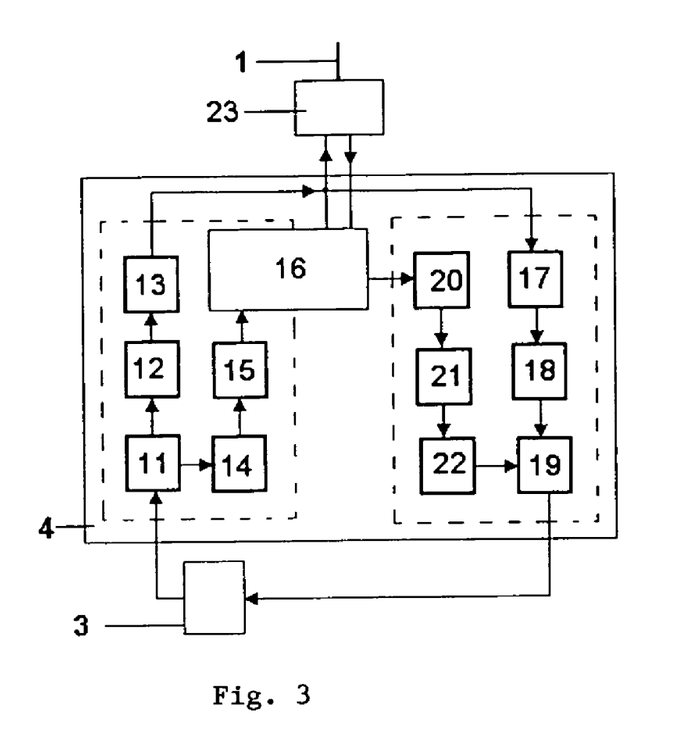
FIG. 3 is a diagrammatic view of a telephone adapter at the side of a telephone set.
Figure 4:
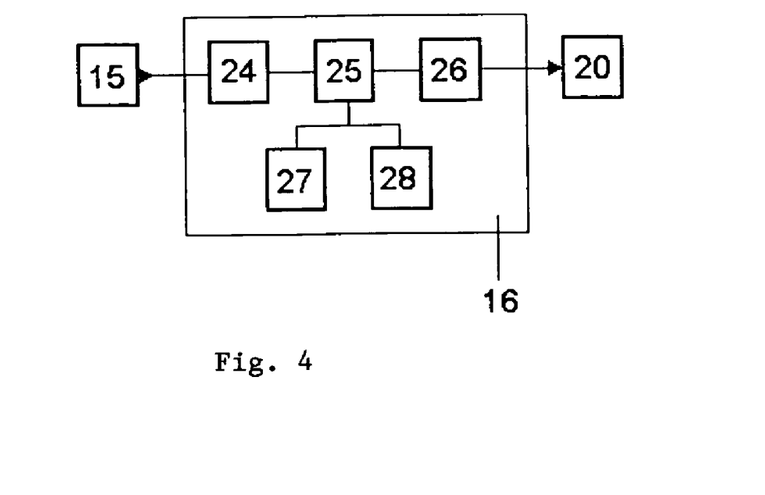
FIG. 4 is a block diagram of a processor module.

The functional block diagram of the adapter is shown in FIGS. 3 and 4. The adapter 4 has a transmission channel and reception channels interconnected by a processor unit. In the transmission channel, the telephone set 3 is connected, through the telephone line, to a signal detector-distributor 11. A first output of the detector-distributor 11 is connected to the input of a tone dialing recognition device 12 adapted to determine the number of the party being called at the reception end of the system. The device 12 has its output connected to the input of a device 13 transmitting the recognized number in the form of a standard computer communication protocol. A second output of the signal detector-distributor 11 is connected to the input of an analog-to-digital converter 14 having its output connected to the input of a digital data compressing device (compressor) 15. The output of the compressor 15 is connected to a processor unit 16 transmitting compressed digital data to the general computer network 1.

In the reception channel, the network 1 is connected to a call number data converter 17 that receives the compressed digital call number data from the general network 1. The output of the converter 17 is connected to the input of a call signal dialer 18 having its output connected to a first input of a voice and tone signal transmission priority (sequence) device 19. The processor unit 16 is connected to the input of a digital data decompressor 20 having its output connected, in turn, to the input of a digital-to-analog converter 21. The digital-to-analog converter 21 is connected to a voice signal transmitter 22 at the receiving end which is connected to a second input of the voice and tone signal sequence transmission device 19 having its output connected to the telephone set 3.

The telephone adapter 4 is connected to the network 1 through a standard network adapter 23, such as a network card Complex RL2000A-PnP, manufactured by Complex Inc., US, since 1996.

The processor unit 16 (FIG. 4) comprises such principal components as a signal (digital data) input-output device at the side of the device 15 and the network 1, a central processor unit 25, an input-output device 26 at the side of the digital data decompressor 20 and the network 1, and also a stored-program memory 27 and a random access memory 28, both connected to the central processor unit 25. The stored program in the microcircuits allows standard exchange of digital data to be effected within the network protocol framework. The processor unit receives digital data from the network, distributes them to the addresses, and transfers the digital data into the network. The processor unit consists of conventional computer or modem components, except that, as compared to a modem, the adapter converts digital signals into signals compatible with the network protocol.

The telephone adapter consists entirely of standard components commonly used in computer systems and modem-type adapters.

A computer telephony server may be provided by any embodiment of a computer station typically designed as described in U.S. Pat. No. 5,742,596, H04L 12/66, published on Apr. 21, 1998, or in EP No. 0,664,637, H04M 11/00, published in 1995, or as disclosed in [8] to [12], [1].

A router may be chosen from among the devices described in [7] or routers manufactured by CISCO and BAY NETWORKS, which are suitable for the purposes of this invention as regards speed and interface.

When a number is dialed on a telephone set, connection is established through the telephone line, followed by tone dialing on the telephone set 3, of the user number at the far end of the system. Having passed through the detector-distributor 11, the message part comprising the tone dialing data reaches first the number recognition device 12 and then the call signal transmission device 13 in the form of a standard protocol, and is applied, through the computer network 1, to the input of the converter 17 at the far end of the receiving party. The data arriving in the converter 17 are converted into a call signal and sent to the call signal dialer 18, whence a signal is received, through the device 19, by the telephone set 3 of the remote user. As the called party responds at the receiving end, signals corresponding to the voice information are directed from the telephone set 3 of the transmitting party, through the detector-distributor 11, to the analog-to-digital converter 14, whence they are routed, after being compressed in the device 15, through the processor unit 16 to the computer network 1, having built-in software to effect standard exchange of digital data within the framework of common network protocols. These data are applied to a similar processor unit at the receiving end of the remote party, where, following decompression in the device 20, they are converted by the digital-to-analog converter 21 into an analog signal. The signal proceeds to a reproducer, the voice and tone signal transmitter 22, whence the signal is directed, through the voice and tone signal transmission priority device 19, into the line opened by the dial signal and linked to the telephone set 3. The party using at the telephone set of the receiving end, therefore, receives a voice message from the party at the transmitting end of the system.

The operation of this business office telephone network and its communication with a remote branch is described with reference to the following principal operation modes:

Calls within the business office;

Calls to the general local telephone network;

Calls from the head office to the branch or from the branch to the head office;

Calls from a telephone set to a computer or from a computer to a telephone set; and Calls from the business office to an Internet telephony network or an IP telephony network.

When calls are made within a business office, with the telephone sets of both the caller and the called party connected through their respective interfaces 4 to the common local office network, removal of the handset of the telephone set 3 sets off a call-ready tone. As a number is entered on the telephone set key pad, signals of the address of the called party in the local network are transferred to the interface 4. A speed dial (address) may be used. If the called party and the caller are connected to the same local network, the initial elements of its address may be omitted or added automatically on dialing.

In response to a connection request, the local network interface 4 transfers the required sequence of digital symbols in the network standard to the local network bus, calling the data receiver. When the receiver (such as the interface 4 of another telephone set or a personal computer 7) responds, virtual connection is established between the interface of the caller and the receiver. An exchange of messages, including voice messages, is then effected. As either of the parties replaces the handset on the telephone set 3 or gives a respective signal for disconnection from the computer 7, the communication session ends and the local network bus interrupts the virtual connection between the users.

When the caller sends an outgoing ring from his telephone set 3 to the general network GTN 6, the called party is reached as follows:

the caller enters a digit corresponding, in accordance with network numbering, to connection to the central network on the key pad of his telephone set, digits "9" and "0" being commonly used for such numbering;

the telephone set interface 4 sends a corresponding signal to connect the local network 1 to the computer telephony server 5. Next, the caller who has keyed in the outgoing network numbering call digit establishes a virtual connection with the computer telephony server 5. Further call digit keying on the telephone set 3 is translated to the computer telephony server 5 and then on to the general telephone network 6. Connection is established when the GTN of the party being called is not engaged. If the party is engaged, the busy state is detected by the computer telephony server 5 and a busy signal is transmitted to the caller through the local network 1 and interface 4 of the telephone set. Similarly, outgoing calls are transferred through the GTN to the long-distance system, using a GTN numbering plan, under which access to the long-distance system is obtained by keying the digit 8.

Calls from the head office to its branch are made as follows:

the internal network number is speed-dialed from the telephone set 3 and transferred to the interface 4;

the interface 4 uses the speed-dialed number to form the device (interface) address being called in the local network 1;

if the address being called is in the remote local network fragment located in the branch, control is turned over to the router 8 connected to the local network 1 of the office;

the router converts the local network data into a communication protocol and establishes a link, through the channel 9, with the other router 10 in the remote office and transfers the data on the address of the device being called to it;

the router of the remote office local network forms call requests for the device connected within the above network fragment (the telephone interface 4 or computer 7), connection being established according to the local network protocol rules;

the parties exchange data; and the virtual connection is broken on a hang-up signal that is generated by the handset replaced or a signal having been given from the computer to break connection.

Calls are made similarly from the branch to the head office.

Calls are made from the telephone set 3 to the computer in the network 1 as follows:

a call containing a local network address is transferred from the telephone set 3, through the interface 4, into the local network;

an analysis of the address called shows that a request for virtual connection is directed to one of the computers in the network 1;

connection is made if the computer being called is provided with appropriate software (multimedia software) and the call is allowed to go through; and the parties then exchange data using the computer column speakers and the microphone connected to the sound card; and the virtual connection is broken on request to break connection.

Note is to be taken of two important circumstances:

1. On request for connection of the remote office, the router 8 analyzes the network address of the party being called. This may be either a computer or a telephone set interface. In this sense, the network is indifferent to the type of the device being called and whether it is situated in this local network or in another, remote office.

2. If the computer telephony server 5 provides for a "transparent" connection of the office telephone network according to this invention to a general telephone network, the router 8 may connect this telephone network to IP telephony networks as well as interconnecting the local networks of the head and remote offices.

This invention helps simplify a telephone network and integrate it with an office computer network. It makes the use of a central telephone office and special wiring within a business office redundant. Its wiring functions are performed by the local computer network. It simplifies connection between the local and telephone networks of a head office and its branches. Instead of a combined design, in which specialized multiplexers are used to combine data flows of local networks and central telephone offices in common channels, this invention allows communication channels between local network routers to be set up quite easily. The telephone networks of remote offices and their numbering plans are combined automatically. This invention allows calls to be made between a telephone set and a computer or between a computer and a telephone set, which are impossible to make in the prior art invention.

This invention offers the following advantages:

parties are switched by selecting the address of a party's device in the local computer network, instead of switching channels of a business office network;

the numbering plan of an office network is built on the addresses of devices connected to a local business office network, rather than on a list of local users corresponding to the connecting lines from the local telephone office to the users;

a single bus of the business office computer network is used in place of separate wiring for telephone sets and computer networks in a business office;

connection between the local computer networks of the head office and its remote branches allows the computer networks of the office and its branches and their telephone networks to be connected automatically, without additional equipment; and business office telephone networks may be organized in the absence of a special-purpose switch for central telephone office channels.

The telephone network is simplified by integrating it with a computer network.

COMMERCIAL APPLICABILITY

This invention is commercially applicable, because its design is based on standard computer equipment and does not require specialized techniques and technology to be used apart from technologies used in building computer stations and computer networks.

REFERENCES

[1] Bolshova, G., "CTI Offers a Comprehensive Solution for Computer Telephony," Seti, No. 2, 1998, pp. 40–46.

[2] Broderick, D., and Tall, B, "High-Speed Data Transfer Routes," Seti, No. 7, 1996, pp. 87–92.

[3] Clark, E., "Gigabit Ethernet Gathers Speed," *LAN Magazine* (Network Solutions Magazine), Vol. 4, No. 3, 1998.

[4] Sungelei, I., "FDDI Networks: Operating Principle, Equipment Used, and Application Options," *Open Systems*, No. 3, 1994.

[5] Carve, A., "Ring Ruler," *LAN Magazine* (Russian-language edition), Vol. 1, No. 4, 1995.

[6] Kulgin, M., "Switching as Routing," *LAN Magazine* (Network Solutions Magazine), Vol. 3, No. 8, 1997.

[7] Varlamova, O., "Noise-Resistant Codecs, the Future of Digital Telephony," Seti, No. 10, 1997, pp. 26–32.

[8] Altergot, A., and Panfilov, I., "Computer and Telephone Meeting Halfway," *LAN Magazine* (Network Solutions Magazine), Vol. 3, No. 8, 1997.

[9] Lippis, N., "IP as an International Voice Communications Infrastructure?" *LAN Magazine* (Network Solutions Magazine), Vol. 3, No. 7, 1997,

[10] Carve, A., "IP Telephony Now Has a Voice," *LAN Magazine* (Network Solutions Magazine), Vol. 4, No. 2, 1998.

[11] Kreines, A., "Our Neighbors' IP Telephony," Seti, No. 5, 1998, pp. 58–59.

[12] Zieger, E., "IP Telephony Becomes a Reality," Seti, No. 3, 1998, pp. 112–117.

[13] Margulis, E., "Ready Pseudo-Office Telephone Swtiches," *LAN Magazine* (Network Solutions Magazine), Vol. 4, No. 4, 1998.

[14] Margulis, E., "Economical Pseudo-Office Telephone Switches," *LAN Magazine* (Network Solutions Magazine), Vol. 4, No. 3, 1998.

What is claimed is:

1. A telephone network for a structured site, essentially of a business office type, consisting essentially of a common single bus of a local external computer network connecting computers at the transmitting and receiving ends of the telephone network for the structured site and telephone sets connected directly to said telephone network to provide telephone communication between the parties at the transmitting and receiving ends through said local external computer network, wherein said local external computer network is provided with a computer telephony server connected directly to the common single bus of the local computer network and to a general telephone network, each telephone set is provided with a telephone set interface, each telephone set interface being connected, directly through a telephone adapter and a network adapter connected in series therewith, to the common single bus of the local external computer network connecting computers, the telephone adapter being capable of converting analog/digital signals adapted to the clock frequency of the local external computer network, user call signals into addresses of other telephone sets connected to said local external computer network, and hang-up signals whereby the telephone sets can communicate with each other without computers by the telephone sets connected to the local computer network, furthermore the telephone adapter has a transmission channel and reception channels, the transmission channel having a signal detector-distributor with an input connected to a telephone set, a first output of said signal detector-distributor being connected to the input of a tone dialing recognition device having its output connected to the input of a recognized number transmission device, which has its output connected to the local external computer network, a second output of the signal detector-distributor being connected to the input of an analog-to-digital converter having its output connected to the input of a compressor whose output is connected to a processor unit having software to allow exchange of digital data to be effected within the framework of common network protocols, and the reception channels having a voice and tone signal transmission priority device having its output connected to the telephone set, and a first input connected to the output of a call signal dialer, whose input is connected to a call number data converter having its input connected to the local external computer network, a second input of the voice and tone signal transmission priority device being connected to the output of a voice signal transmitter, whose input is connected to the output of a decompressor having its input connected to said processor unit.

2. A network as claimed in claim 1, wherein two or more computers connected to said telephone network are provided with multimedia software to allow direct voice telephone communication.

3. A network as claimed in claim 1, wherein said processor unit comprises a central processor connected to digital data input-output devices and to a stored-program memory and a random access memory to allow exchange of digital data to be effected within the framework of common network protocols.

4. A system to maintain telephone communication between remote structured sites, comprising, at a first site, an internal telephone network including a common bus of a local computer network to connect computers at the transmitting and receiving ends of the system, a computer telephony server connected to the common bus of the local computer network of said first site and to the general telephone network, and telephone sets to provide telephone communication between parties at the transmitting and receiving ends through said local computer network, each telephone set is provided with a telephone set interface, each telephone set interface being directly connected through a telephone adapter and a network adapter connected in series therewith to the common bus of the local computer network, the telephone adapter being capable of converting analog/digital signals adapted to the clock frequency of the local computer network, user call signals into the addresses of other telephones connected to said local computer network, and hang-up signals, each successive site having an internal telephone network duplicating the internal telephone network of the first site, the local computer network of each site being provided with a router connected thereto and to a router of the local computer network of at least one other site through a communication channel of the computer networks of the remote structured sites whereby the telephone sets can communicate directly with each other without computers, furthermore the telephone adapter has a transmission channel and at least one reception channel, the transmission channel having a signal detector-distributor connected to the input of the telephone set and a first output connected to the input of a tone dialing recognition device, whose output is connected to the input of a recognized number transmission device having its output connected to the local computer network, a second output of the signal detector-distributor being connected to the input of an analog-to-digital converter having its output connected to the input of a compressor whose output is connected to a processor unit provided with software to allow exchange of digital data to be effected within the framework of common network signal transmission priority device being connected to the output of a voice signal transmitter, whose input is connected to the output of a decompressor having its input connected to said processor unit.

5. A system as claimed in claim 4, wherein two or more computers connected to said internal telephone network are provided with multimedia software to allow direct voice telephone communication and said network is free of specialized switching devices.

6. A system as claimed in claim 4, wherein said processor unit is a central processor connected to a digital data input-output device and to a stored-program memory and to a random access memory to allow exchange of digital data within the framework of common network protocols.

7. A telephone network for a structured site, essentially of a business office type, comprising a common bus of a local computer network connecting computers at the transmitting and receiving ends of the telephone network for the structured site and telephone sets to provide telephone communication between the parties at the transmitting and receiving ends through said local computer network, each said telephone set being provided with a telephone set interface, each telephone set interface being connected, directly through a telephone adapter and a network adapter connected in series therewith, to the common bus of the local computer network, the telephone adapter being capable of converting analog/digital signals adapted to the clock frequency of the local computer network, user call signals into addresses of other telephone sets connected to said local computer network, and hang-up signals whereby the telephone sets can communicate with each other without computers by the telephone sets connected to the local computer networks, furthermore the telephone adapter has a transmission channel and at least one reception channel, the transmission channel having a signal detector-distributor with an input connected to a telephone set, a first output of said signal detector-distributor being connected to the input of a tone dialing recognition device having its output connected to the input of a recognized number transmission device, which has its output connected to the local computer network, a second output of the signal detector-distributor being connected to the input of an analog-to-digital converter having its output connected to the input of a compressor whose output is connected to a processor unit having software to allow exchange of digital data to be effected within the framework of common network protocols, and at least one reception channel having a voice and tone signal transmission priority device having its output connected to the telephone set and a first input connected to the output of a call signal dialer, whose input is connected to a call number data converter having its input connected to the local computer network, a second input of the voice and tone converting analog/digital signals adapted to the clock frequency of the local computer network, user call signals into addresses of other telephone sets connected to said local computer network, and hang-up signals.

8. The network as claimed in claim 7, wherein the digital signals are converted into signals compatible with the network protocol.

9. The network as claimed in claim 7, wherein two or more computers connected to said network are provided with multimedia software to allow direct voice telephone communication.

* * * * *